United States Patent
Mizukoshi et al.

(10) Patent No.: US 6,764,406 B2
(45) Date of Patent: Jul. 20, 2004

(54) CONSTANT VELOCITY JOINT OF TRIPOD TYPE

(75) Inventors: Yasumasa Mizukoshi, Fujisawa (JP); Minoru Ishijima, Isesaki (JP); Toshihiro Ikeda, Takasaki (JP)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/976,345

(22) Filed: Oct. 12, 2001

(65) Prior Publication Data

US 2002/0055389 A1 May 9, 2002

(30) Foreign Application Priority Data

Oct. 13, 2000 (JP) .................................. 2000-314305

(51) Int. Cl.[7] .............................................. F16D 3/205
(52) U.S. Cl. ...................................... 464/111; 464/905
(58) Field of Search ............................. 464/111, 123, 464/124, 905; 384/154, 193, 205, 208, 226

(56) References Cited

U.S. PATENT DOCUMENTS

| | | | |
|---|---|---|---|
| 4,411,545 A | * | 10/1983 | Roberge .................. 384/208 X |
| 5,114,261 A | | 5/1992 | Sugimoto et al. |
| 5,362,275 A | | 11/1994 | Girguis |
| 5,791,995 A | * | 8/1998 | Kudo et al. ............. 464/111 X |
| 5,989,124 A | | 11/1999 | Goto et al. |
| 6,200,224 B1 | | 3/2001 | Sugiyama et al. |
| 6,227,978 B1 | | 5/2001 | Maucher et al. |

FOREIGN PATENT DOCUMENTS

| | | | | |
|---|---|---|---|---|
| JP | 61-266830 A | * | 11/1986 | .................. 464/111 |
| WO | 95/23928 | * | 9/1995 | .................. 464/111 |

* cited by examiner

*Primary Examiner*—Greg Binda
(74) *Attorney, Agent, or Firm*—Michael D. Smith

(57) ABSTRACT

A constant velocity joint of tripod type which is both highly strong and durable, and which can maintain a low axial force and low shudder when transmitting torque at a joint angle. The constant velocity joint of tripod type comprises a roller assembly including an outer roller, an inner roller and a needle bearing located therebetween. The outer roller is provided with needle bearing retaining rings and needle bearing stop rings, at each of its upper and lower ends, respectively. The inner roller moves relative to the outer roller in the axial direction. The outer face of the inner roller and the inner face of the outer roller have generally spherical shapes of dimensions similar to each other to freely engage, respectively. The outer face of the trunnion is provided with a partially cylindrical portion with inclined relative to a trunnion centerline.

7 Claims, 11 Drawing Sheets

MOMENT FOR ROTATING THE OUTER ROLLER

CONTACT BETWEEN THE GROOVE OF THE HOUSING AND THE OUTER ROLLER AT THE OPPOSITE SIDE OF THE LOADED SIDE

CONSTANT VELOCITY JOINT OF TRIPOD TYPE

FIELD OF THE INVENTION

The present invention relates to a constant velocity joint of tripod type, which is disposed between rotating shafts connected at a joint angle with each other in a drive axle of, for example, an automobile, for transmitting a rotational torque.

BACKGROUND OF THE INVENTION

Tripod type constant velocity joints are one of a number of types of constant velocity joints used in drive axles of, for example, automobiles. For example, Japanese Laid Open Patent Application Nos. S63(1988)-186036 and S62(1987)-233522 disclose a tripod type constant velocity joint 1, as shown in FIGS. 15 and 16. This constant velocity joint 1 is provided with a hollow cylindrical housing 3 which is secured to an end of a first rotating shaft 2 serving as a drive shaft or the like on the differential gear side, and a tripod 5 which is secured to an end of a second rotating shaft 4 serving as driven shaft or the like on the wheel side. Grooves 6 are formed at three locations on the internal face of the housing 3 at an even spacing in the circumferential direction and extend outwardly in the radial direction of the housing 3 from said internal face.

On the other hand, the tripod 5 secured at one end of the second rotating shaft 4 comprises a unified form of a boss 7 for supporting the tripod 5 at one end of the second rotating shaft 4, and trunnions 8 formed on three locations at equal spacing around the boss 7 in the circumferential direction. Around the respective trunnions 8 each of which is cylindrically formed, rollers 9 are rotatably supported through a needle bearing 10, while allowing the rollers 9 to be displaced in the axial direction by certain distances. A joint is provided by engaging the respective rollers 9 with the grooves 6 on an inner face of the housing 3. Respective pairs of side faces 11, on which each of the above grooves 6 is provided, are formed to circular recesses. Accordingly, each of the rollers 9 is rotatably and pivotably supported between the respective pairs of the side faces 11.

When the constant velocity joint 1 as described above is used, for example, the first rotational shaft 2 is rotated. The rotational force of the first rotational shaft 2 is, from the housing 3, through the roller 9, the needle bearing 10 and the trunnion 8, transmitted to the boss 7 of the tripod 5, thereby rotating the second rotational shaft 4 the end of which is fixed to the boss 7. Further, if a central axis of the first rotational shaft 2 is not aligned with that of the second rotational shaft 4 (namely, a joint angle is not zero in the constant velocity joint 1), each of the trunnion 8 displaces relative to the side face 11 of each of the grooves 6 to move around the tripod 5, as shown in FIGS. 15 and 16. At this time, the rollers 9 supported at the ends of the trunnions 8 move along the axial directions of the trunnions 8, respectively, while rolling on the side faces 11 of the grooves 6, respectively. Such movements ensure that a constant velocity between the first and second rotational shafts 2 and 4 is achieved, as is well known.

If the first and second rotational shafts 2 and 4 are rotated with the joint angle present, in the case of the constant velocity joint 1 which is constructed and operated as described above, each of the rollers 9 moves with complexity. For example, each of the rollers 9 moves in the axial direction of the housing 3 along each of the side faces 11, while the orientations of the rollers 9 are being changed and further the rollers 9 displace in the axial direction of the trunnion 8. Such complex movements of the rollers 9 cannot cause a relative movement between a peripheral outside face of each of the rollers 9 and each of the side faces 11 to be smoothly effected. Thus, a relatively large friction occurs between the faces. As a result, in the constant velocity joint 1 of FIGS. 15 and 16, three-directional axial forces occurs per one rotation. It is known that an adverse oscillation referred to as "shudder" may occur in some cases, if a large torque is transmitted with a relatively large joint angle present.

To prevent any oscillation from occurring due to the above cause, for example, Japanese Laid-Open Patent Application No. H3(1991)-172619 discloses a structure shown in FIG. 17 and Japanese Publication Patent Application No. H4(1992)-503554 discloses structures shown in FIGS. 18 and 19.

In the case of a structure shown in FIG. 17, since movement of an outer roller 16 and an inner roller 12 in an axial direction of a trunnion 8 is limited, when a constant velocity joint of the structure rotates at a joint angle, a large amount of frictional resistance is generated due to any axial displacement between the inner cylindrical face of the inner roller 12 and the spherical trunnion 8, applying a pressing force onto the inner roller 12 and the outer roller 16, and then producing a frictional force preventing the inner roller 12 and the outer roller 16 to be rotated with each other.

Moreover, since an area of contact between the inner cylindrical face of the inner roller 12 and the spherical trunnion 8 is small, when torque is transmitted through the contact area during rotation at a joint angle, it is susceptible to wear and damage.

In the case of the joint shown in FIG. 18, the number of components is increased since an element is provided for determining the location of an inner roller relative to a partially spherical trunnion, and also the machining process is relatively complicated.

In the case of the joint shown in FIG. 19, since the inner roller are deformed in assembling, a wall thickness of an inner roller is in part reduced causing it to be relatively weak.

SUMMARY OF THE INVENTION

The object of the present invention is to provide a tripod type constant velocity joint which is both highly strong and durable, and which can maintain a low axial force and low shudder when transmitting torque at an angle.

In order to attain the above object, a constant velocity joint of tripod type according to the first aspect of the invention comprises a cylindrical hollow housing defining an opening at one end. The housing is secured at its opposite end to a first rotating shaft such that a central axis of the housing is aligned with that of the first rotating shaft. An inner face of the housing is provided with three guide grooves extending in an axial direction of the housing and being spaced apart equally in a circumferential direction. Each groove has a pair of side faces opposed to each other and extends in the axial direction with a bottom portion connected between the side faces. A tripod is provided at an angle normal to a second rotating shaft and secured to one end of the second rotating shaft. The tripod has three trunnions positioned in the grooves. The trunnions are spaced apart equally in a circumferential direction and secured equally to the second rotating shaft at an angle normal. Respective inner rollers are mounted to outside end portions of respective trunnions and respective outer rollers are mounted on the outer faces of inner rollers through a needle bearing. The outer faces of the outer rollers are shaped so as to allow movement only in an axial direction of the grooves. Each of the trunnions has a generally spherical outer face, and each of the inner rollers has a generally spherical outer face. Respective generally spherical outer faces of the inner rollers have approximately the same dimensions as respective generally spherical outer faces of the trunnions such that respective inner rollers may rotate and pivot freely on respective outer faces of respective outer face of respective trunnions.

The constant velocity joint of tripod type is characterized in that, on each outer face of each trunnion, there is provided a partially cylindrical area inclined relative to a trunnion centerline (Q). The trunnion centerline (Q) means a line passing through a center (O) of the generally spherical outer face of the trunnion, perpendicular to a trunnion axis (M) of the trunnion, and being on a face including the trunnion axis (M) and a portion in contact with the inner roller, with a joint angle being zero. The trunnion axis (M) means an axis passing through the center (O) of the generally spherical outer face of the trunnion, and perpendicular to the second rotating shaft.

In order to attain the above object, a constant velocity joint of tripod type according to the second aspect of the invention is characterized in that a diameter (d) of each partially cylindrical area provided on each outer face of each trunnion is related to an inner diameter (D) of each inner joint end surface of each inner roller in accordance with the following formula:

$$(d) < (D)$$

and $$5° \leq \text{angle}(\theta),$$

wherein the angle ($\theta$) is an angle of a line connecting between the center (O) of the trunnion and a farthest point (P), relative to the trunnion centerline (Q). An intersection line (13a) being an edge line of the partially cylindrical area at an inner side of a joint. The farthest point (P) being on a location where the intersection line (13a) is farthest from a center of a joint, on the outer face of the trunnion.

The present invention can provide a tripod type constant velocity joint which is both highly strong and durable, and which can maintain a low axial force and low shudder when transmitting torque at a joint angle.

These and other objects and advantages of the present invention will be more apparent from the following detailed description and drawings in which:

DESCRIPTION OF THE PREFERRED EMBODIMENTS

Preferred embodiments of the present invention will now be described with reference to the drawings.

Figure 1B:
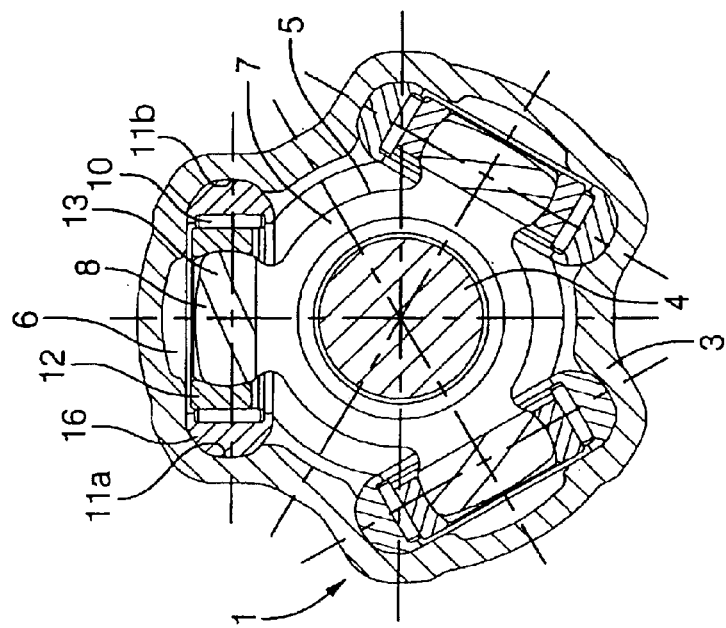
FIG. 1B is a cross-sectional view of the primary portion of the tripod type constant velocity joint according to the first embodiment of the present invention.
Figure 1A:
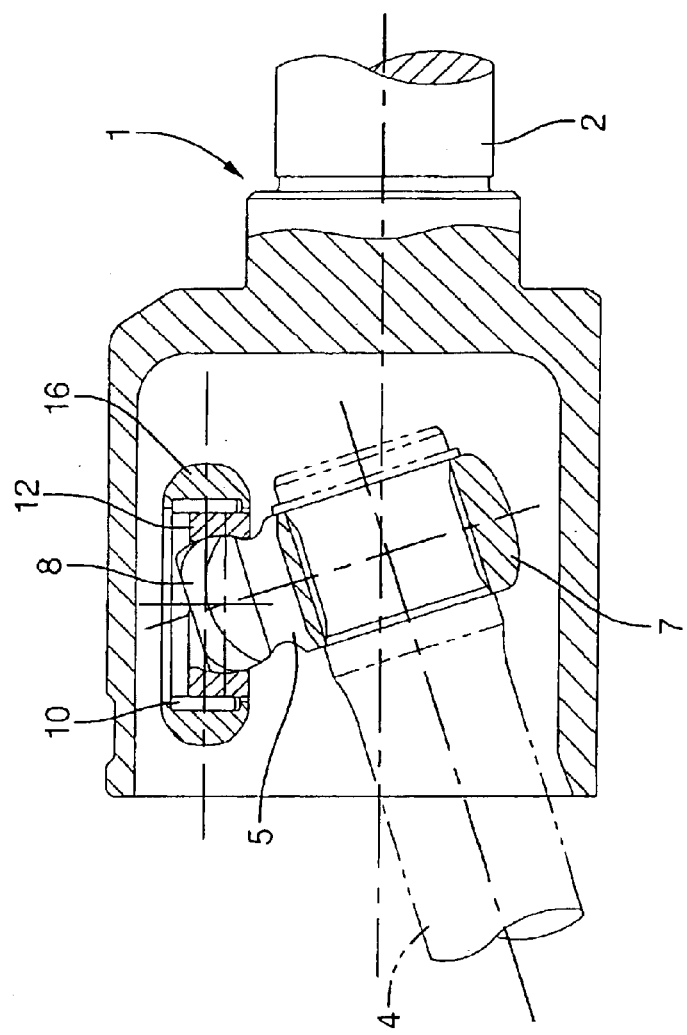
FIG. 1A is a longitudinal cross-sectional view of a primary portion of a tripod type constant velocity joint according to the first embodiment of the present invention.

FIG. 1 shows cross-sectional views of a tripod type constant velocity joint according to the first embodiment of the present invention, incorporated in a drive system of, for example, an automobile; wherein, FIG. 1A is a longitudinal cross-sectional view, and FIG. 1B is a cross-sectional view with a joint angle being zero.

A constant velocity joint 1 shown in FIG. 1 comprises a hollow cylindrical housing with one end defining an opening, and the other end secured to an end of a first rotating shaft 2 serving as a drive shaft or the like, with a tripod being secured at one end of a second rotating shaft 4 serving as a driven shaft or the like on a wheel side. On the inner surface of the housing 3 there are provided three grooves 6 which are equally spaced in a circumferential direction, and positioned at equal distances from the axis of the first rotating shaft 2. The grooves 6 are recessed from the inner surface outwardly in radial direction of the housing 3.

A tripod 5 is secured at one end of the second rotating shaft 4 and comprises a boss 7 for supporting the tripod 5 at one end of the second rotating shaft 4, with three trunnions 8 being formed at equal spacings around the boss 7 in the circumferential direction, which will be described later. An inner roller 12 and an outer roller 16 of a roller assembly are mounted on each of the trunnions 8 with needle roller bearings 10 so as to rotate freely. Then, a joint is constituted by fitting these outer rollers 16 into the grooves 6 of said housing 3. In addition, a pair of parallel side faces 11a and 11b defining the groove 6 have spherical concave surfaces, respectively. The outer roller 16 is supported between the pair of side faces 11a and 11b so as to roll and pivot freely.

When the constant velocity joint 1 as described above is used, for example, the first rotational shaft 2 is rotated. The rotational force of the first rotational shaft 2 is transmitted from the housing 3, through the roller assembly, the needle bearing 10 and the trunnion 8, to the boss 7 of the tripod 5, thereby rotating the second rotational shaft 4 the end of which is fixed to the boss 7. Further, if a central axis of the first rotational shaft 2 is not aligned with that of the second rotational shaft 4 (namely, a joint angle is not zero in the constant velocity joint 1), each of the trunnion 8 displaces relative to a side face of each of the grooves 6 so as to pivot around the tripod 5. At this time, the outer rollers 16 supported at the ends of the trunnions 8 roll and move on the side faces 11a, 11b of the guide grooves 6, respectively, thereby absorbing any axial relative displacement occurring between the outer rollers 16 and the inner rollers 12. Such movements ensure that a constant velocity between the first and second rotational shafts 2 and 4 is achieved.

Next, the first embodiment of the present invention will be described in detail with reference to FIGS. 2 and 3.

Figure 2:
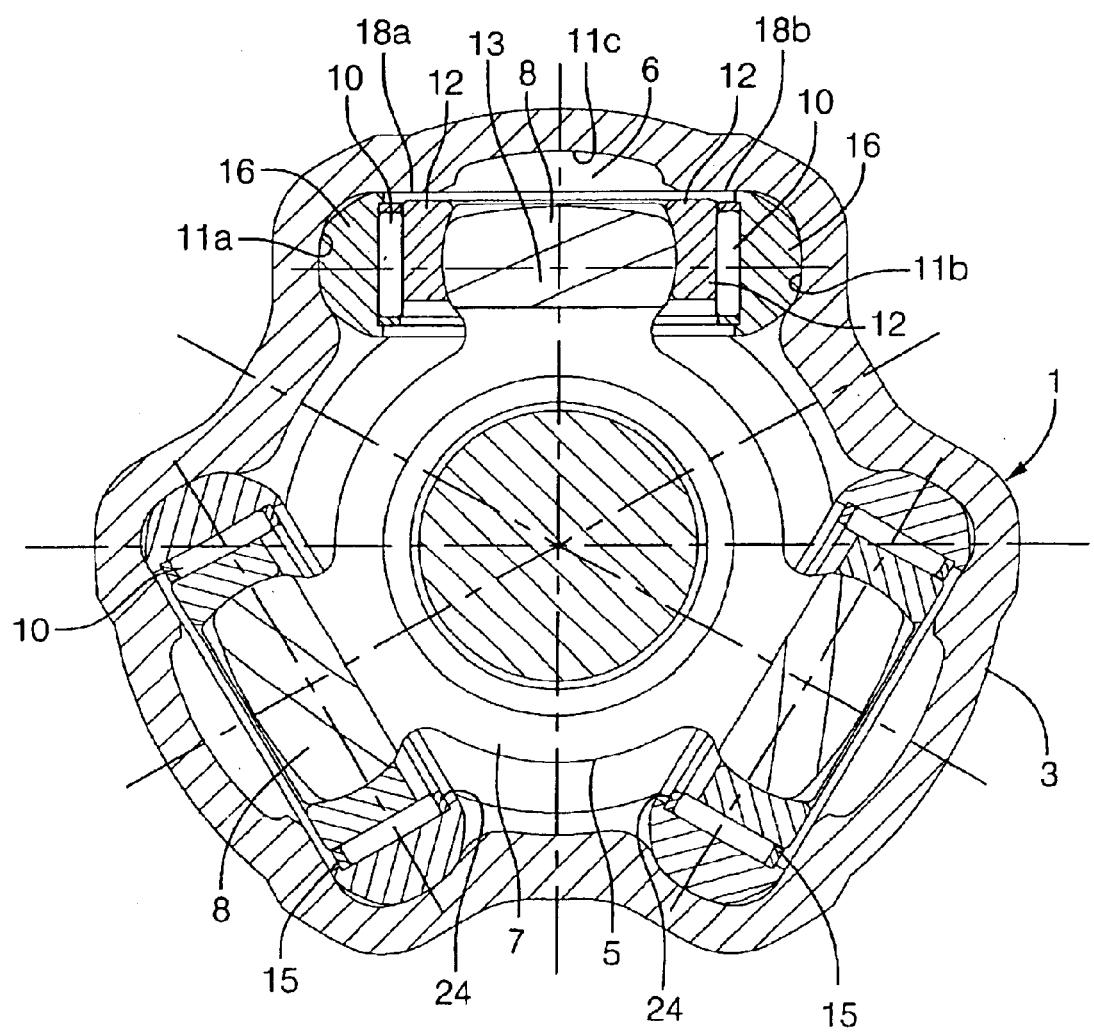
FIG. 2 is a cross-sectional view of the first embodiment of the present invention.
Figure 3:
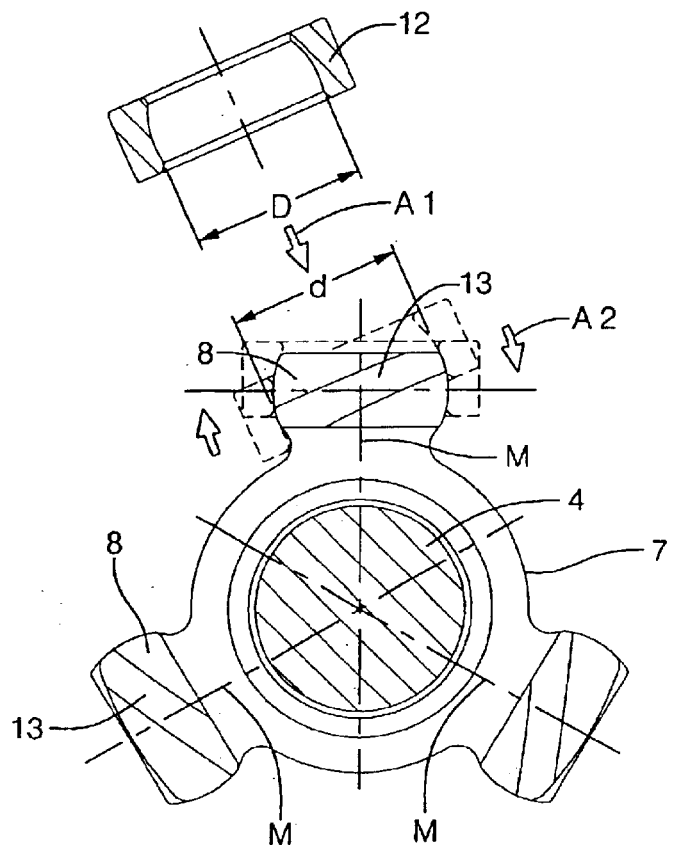
FIG. 3A is an explanatory view showing the assembly of a roller of the first embodiment of the present invention.
FIG. 3B is an explanatory view showing an area that receives a load during movement of the first embodiment of the present invention.
Figure 3:
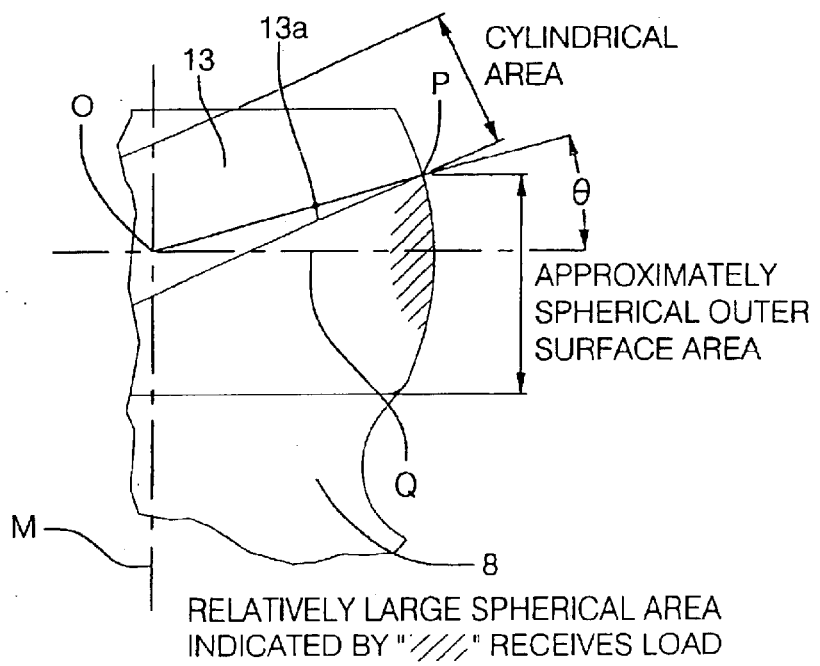

FIG. 2 is a cross-sectional view showing a tripod type constant velocity joint 1 of the first embodiment of the present invention with a joint angle being zero. FIG. 3A is an explanatory view showing an assembly of the inner rollers 12 on the trunnions 8; and FIG. 3B is an explanatory view showing an area of the trunnions 8 which receives a load.

As described earlier, the tripod type constant velocity joint 1 according to the first embodiment comprises a hollow housing 3 secured at an end of a first rotating shaft 2 (shown in FIG. 1A) serving as a drive shaft or the like and a tripod 5 secured at one end of the second rotating shaft 4 serving as a driven shaft or the like on the wheel side. Grooves 6, which are provided as recesses extending in the axial direction (a direction extending between the front side and the rear side in a paper of FIG. 2) are formed on three locations at equal spacing on an inner face of the housing 3 in the circumferential direction, and are recessed radially from the inner faces toward the outside of the housing 3.

Moreover, each of the guide grooves 6 of the housing 3 comprises a pair of opposed side faces 11a, 11b and a bottom portion 11c continuously connected to the both side faces 11a, 11b. The side faces 11a, 11b correspond to a convex spherical outer face of the outer roller 16, and hence is formed as a spherical concave surface of approximately the same dimension as the outer face of the outer roller 16. The side faces 11a, 11b extend in the longitudinal direction of the housing 3 or the axial direction of the first rotating shaft 2.

Each of the bottom portions 11c of the guide grooves 6 is provided with the tracking guides 18a and 18b for guiding each of the outer rollers 16 in contact with an outside end surface of the outer roller 16. In this way, the side faces 11a, 11b of the guide grooves 6 provide a tracking surface on which the outer roller 16 can slide and roll.

The trunnion 8 has a generally spherical convex outer surface, the center of which lies along the trunnion axis (M) (described later). In addition, a partial cylindrical face 13 is formed on the outer surface of the trunnion 8 so as to be inclined relative to the trunnion centerline (Q) (described later). On the outer surfaces of the trunnions 8, respective inner rollers 12 are mounted to enable the trunnions 8 to pivot and rotate freely. The inner surface of the inner roller 12 has a generally spherical inner face which has similar dimensions to the outer surface of the trunnion 8, and is mounted directly on the outer surface of the trunnion 8. In addition, the inner roller 12 has a cylindrical outer surface and the outer roller 16 has a cylindrical inner surface. With the outer roller 16 being engaging with the inner roller 12 through the needle bearings 10. Further, the outer face of the outer roller 16 is in part spherical.

Next, the way in which the inner roller 12 is fitted to the trunnion 8 will be described.

FIG. 3A is an explanatory view showing the steps of fitting the inner roller 12 having the spherical inner face to the trunnion 8 having the spherical outer surface.

When (D) means an inner diameter of an end face of the inner roller 12 at the joint inner side and (d) means a diameter of the partial cylindrical face 13 which is inclined relative to the trunnion centerline (Q) (described later), the relation of (d)<(D) exists. Consequently, as shown in FIG. 3A, after making the end face of the inner roller 12 at the joint inner side parallel to the partial cylindrical face 13 and bringing the inner roller 12 into contact with the trunnion 8, it becomes possible to install the inner roller 12 on the trunnion 8 by rotating the inner roller 12 with the inner face of the inner roller 12 being in contact with the outer surface of the trunnion 8, as indicated by the arrows A1 and A2 in FIG. 3A. After installing the inner roller 12 on the trunnion 8, an allowable amount of pivot (of pivot angle) of the inner roller 12 on the spherical outer surface (the direction indicated by arrow A2 in FIG. 3A of the trunnion 8 is limited to prevent detachment during use of the joint 1.

Next, with reference to FIG. 3B, the load applied to the trunnion 8 during operation will be explained. As shown in FIG. 3B, a point (O) is defined as a center of the trunnion 8. The trunnion 8 is perpendicular to the second rotating shaft 4 (see FIG. 1) and has the spherical convex outer surface. The trunnion axis (M) is defined as an axis which passes through the center (O) of the trunnion 8.

In addition, with a joint angle being zero, a trunnion centerline (Q) is defined as a line which is on a plane including a contact portion where the trunnion 8 is in contact with the inner roller 12, and the trunnion axis (M), and which passes through the center (O) of the spherical end surface of the trunnion 8 and is perpendicular to the trunnion axis (M).

Moreover, a farthest point (P) is defined as a point which is on a location farthest from a joint center among points of the intersection line (13a) on the outer surface of the trunnion 8.

When (θ) is defined as an angle of a line connecting between the farthest point (P) and the center (O) of the trunnion 8, relative to the trunnion centerline (Q), the angle (θ) is set to be 5°<(θ). Thus, a relatively large spherical outer surface area of the trunnion 8 is provided for receiving a load applying onto the outer surface of the trunnion 8. Accordingly, a contact surface area for receiving the load is increased, thereby enabling contact stress to be dispersed. The cylindrical face 13 formed on the trunnion 8 does not intersect the contact surface area on each trunnion 8. As such, the contact surface area receives the load during rotation of the joint 1.

According to the first embodiment of the invention, when the joint 1 is rotated with the usual joint angle present in attaching to an automobile, a force occurs due to up and down movements of the trunnion 8 relative to the outer roller 16 in the axial direction of the trunnion 8 (access of the roller). This force can be absorbed because the outer surface of the inner roller 12 slides and rotates on an inner face of the needle bearing 10 located between the outer roller 16 and the inner roller 12. Thus, a sliding resistance of the outer roller 16 can be significantly reduced or minimized, as compared to a pure sliding resistance of the prior art structure.

The above operation allows the outer roller 16 and the inner roller 12 to be stably rolled with low friction. Hence, a constant velocity joint of a tripod type of the embodiment can be highly strong and durable with a low axial force.

In addition, in the first embodiment of the present invention, as shown in FIG. 2, the outer roller 16 is provided with needle bearing retaining rings 15 and needle bearing stop rings 24, at each of its upper and lower ends, respectively.

Next, the second embodiment of the present invention will be described with reference to FIG. 4.

Figure 4:
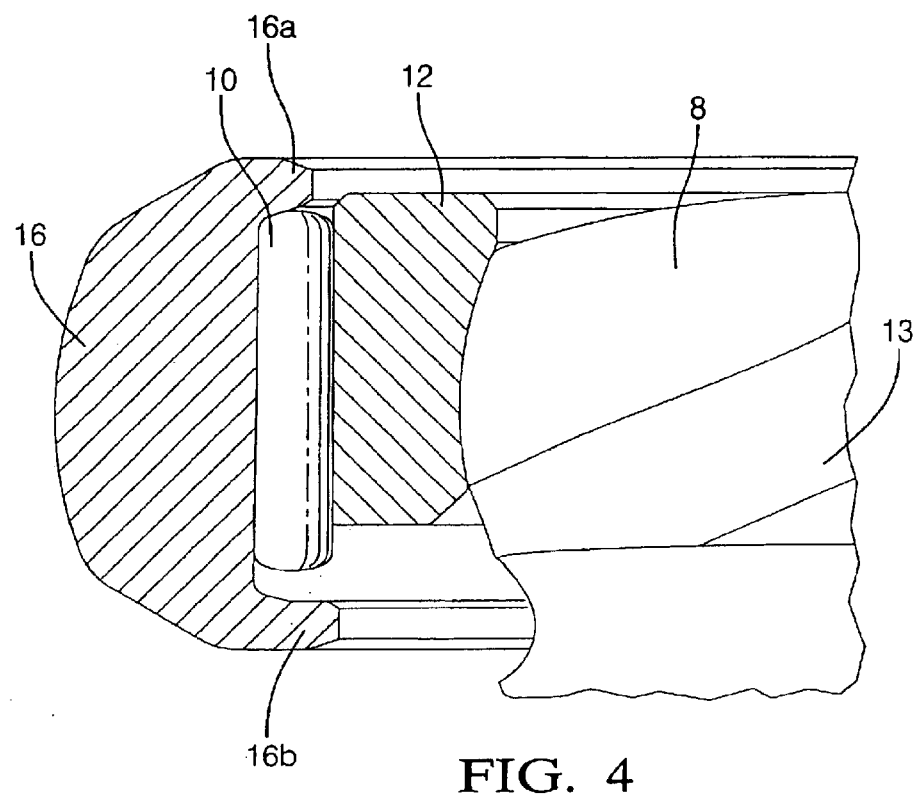
FIG. 4 is a cross-sectional view of a primary portion of the second embodiment of the present invention.

FIG. 4 shows a structure employed to prevent needle roller bearings from becoming dismounted in a tripod type constant velocity joint according to the present invention.

The basic structure of the tripod type constant velocity joint 1 of FIG. 4 has the same structure as that defined in the first embodiment, as shown in FIG. 2. However, in the structure shown in FIG. 4, needle stoppers 16a and 16b are formed integral with the outer roller 16 around both circumferential ends of cylindrical inner surface of the outer roller 16, so that the number of components can be reduced.

Alternatively, it is also possible to constitute a structure wherein only a single needle stopper, either 16a or 16b, is formed to be integral with a circumferential end of the cylindrical inner surface of an outer roller 16 and the other needle stopper is a separate member.

Next, the third embodiment of the present invention will be described with reference to FIG. 5.

Figure 5:
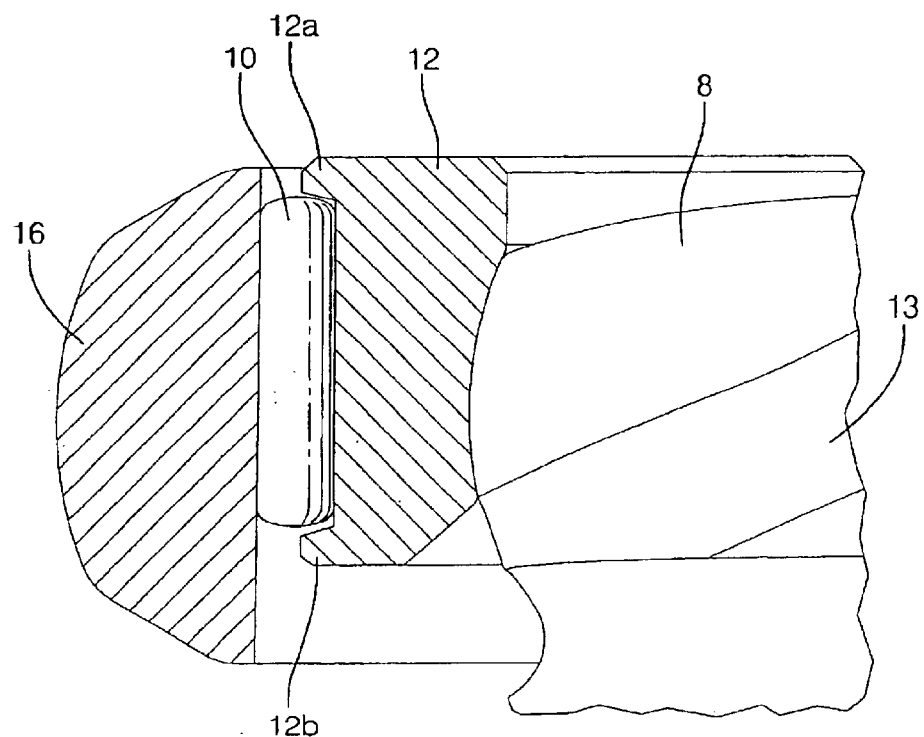
FIG. 5 is a cross-sectional view of a primary portion of the third embodiment of the present invention.

FIG. 5 shows a structure which prevents needle bearings from becoming dismounted in a tripod type constant velocity joint according to the present invention.

The basic structure of the tripod type constant velocity joint 1 of FIG. 5 has the same structure as that defined in the first embodiment, as shown in FIG. 2. However, in the structure shown in FIG. 5, needle stoppers 12a and 12b are formed integral with the inner roller 12 around both circumferential ends of the cylindrical outer surface of the inner roller 12, so that the number of components can be reduced.

Alternatively, it is also possible to constitute a structure wherein only a single needle stopper, either 12a or 12b, is formed to be integral with a circumferential end of the cylindrical outer surface of the inner roller 12 and the other needle stopper is a separate member.

Next, the fourth embodiment preferable to the present invention will be described.

Figure 6:
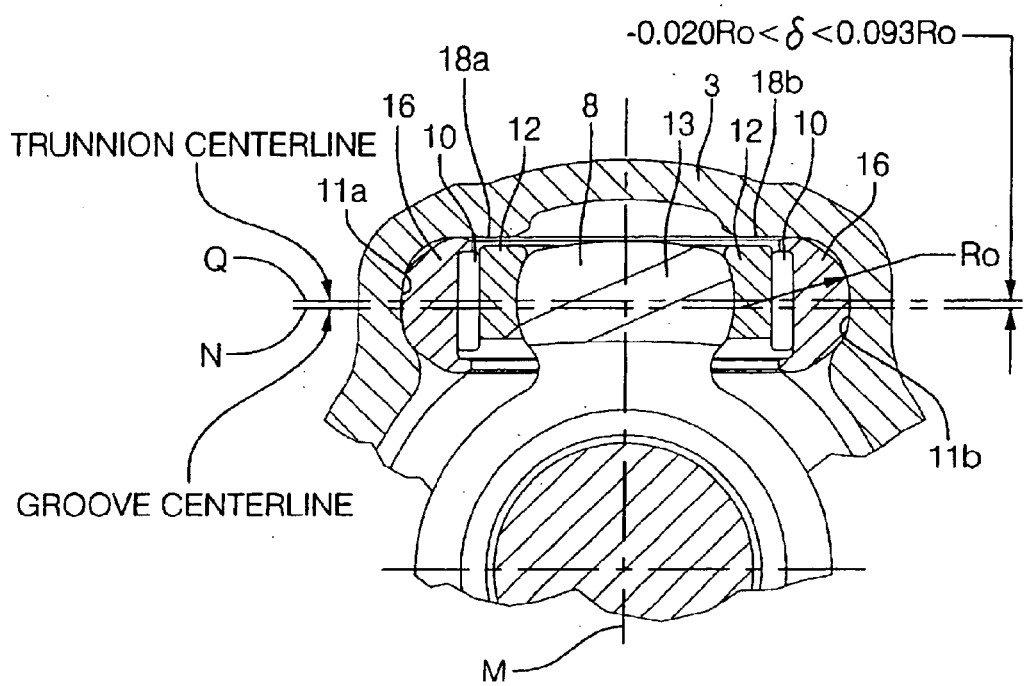
FIG. 6 is a cross-sectional view of a primary portion of the fourth embodiment of the present invention.
Figure 7:
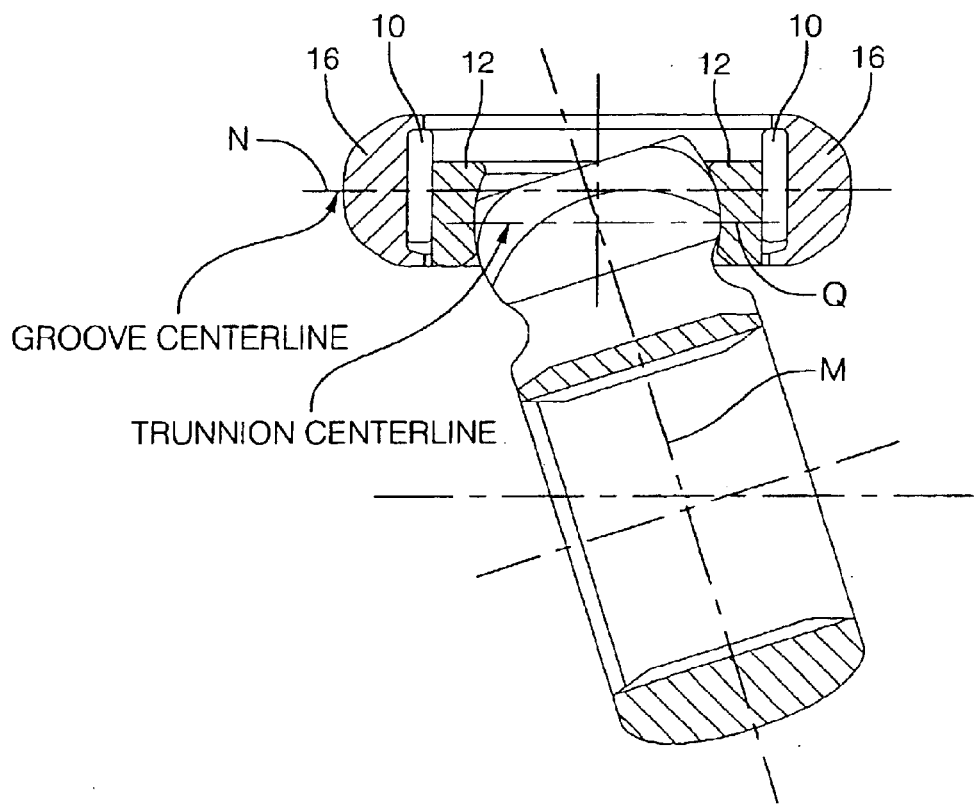
FIG. 7 is a cross-sectional view showing a state of the fourth embodiment of the present invention with any joint angle present.
Figure 8:
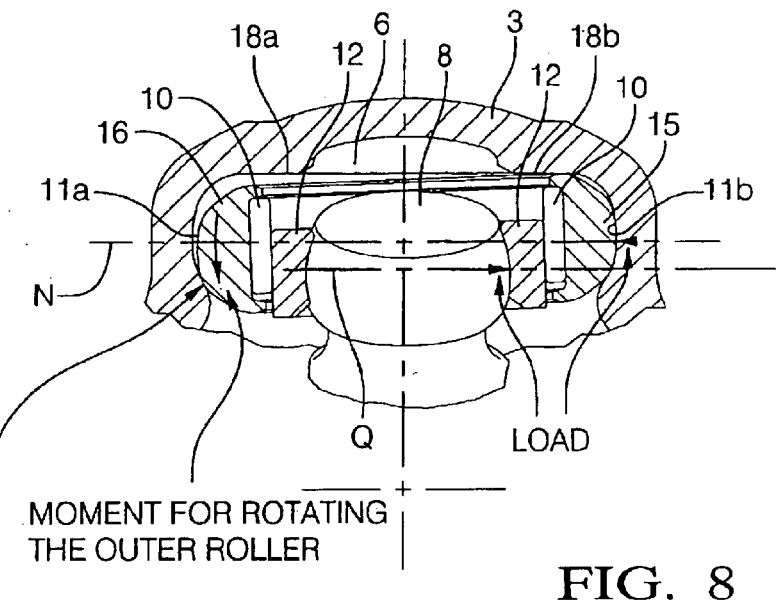
FIG. 8 is an explanatory view showing a state of the fourth embodiment of the present invention in which a load is applied at one side of the trunnion.
Figure 9:
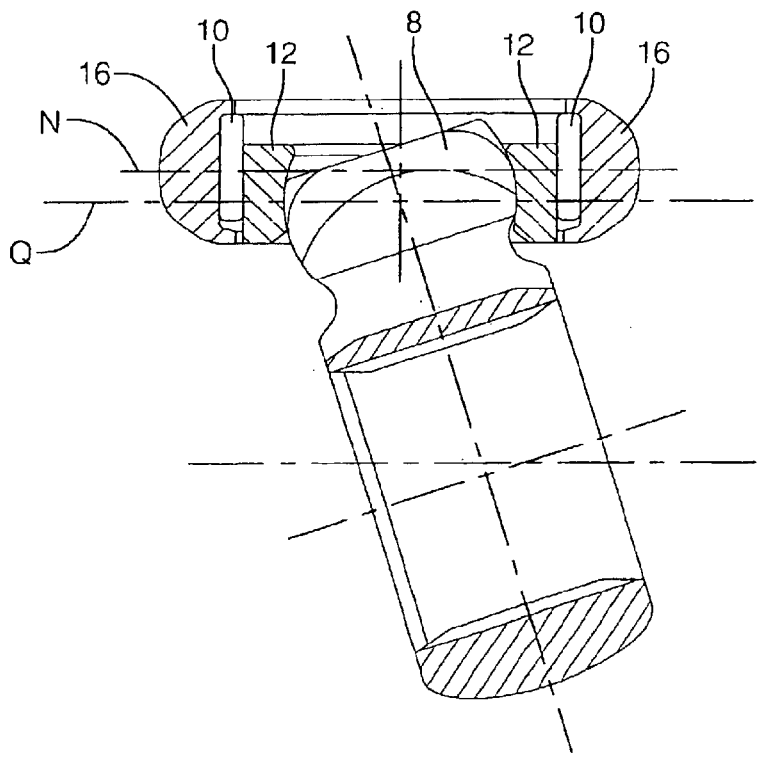
FIG. 9 is a view corresponding to FIG. 8 with a joint angle present.

FIGS. 6 through 9 are explanatory views of a tripod type constant velocity joint to be incorporated in the drive system of, for example, an automobile, according to the fourth embodiment of the present invention. FIG. 6 is a cross-sectional view showing a tripod type constant velocity joint according to the fourth embodiment of the present invention. FIG. 7 is a cross sectional view showing the trunnion 8 with any joint angle present. FIG. 8 is an explanatory view of the trunnion 8 in which a load is applied onto only one side of the trunnion 8. FIG. 9 is an explanatory view of the trunnion 8 on which a load is applied, with any joint angle present.

The main difference in the fourth embodiment from the first embodiment is that there is an offset between a trunnion centerline (Q) and a groove centerline (N). This will be described later. In the fourth embodiment, the same components as used in the first embodiment of the present invention will be indicated by the same symbols. The details regarding the different components will be described in detail hereinafter.

In FIG. 6, a groove centerline (N) is shown as a straight line connecting the arc centers of recessed circular side faces 11a and 11b of the guide groove.

When the joint 1 is rotated with any joint angle present, the trunnion centerline (Q) of the trunnion 8 shifts toward the inside of the joint 1 relative to the groove centerline (N) as shown in FIG. 7. If there is a large offset toward the inside of the joint 1. from the groove centerline (N) to the trunnion centerline (Q) with a joint angle being zero, the offset is more increased with a joint angle present. If the offset becomes larger as in the latter case, the outer roller 16 receives a load on the groove centerline (N), while the inner roller 18 receives a load on the centerline (Q), as shown in FIG. 8. As a result of an offset between load points onto the loads are applied, a counter clockwise moment is generated around an axis connecting the both loaded points, in FIG. 8. This moment tends to rotate the outer roller 16 counter-clockwise toward the inner direction of the joint (the direction shown by an arrow in FIG. 8) at the opposite side of the loaded points. Thus, the moment causes the outer roller 16 to be highly pressed onto the inner face of the housing 3 of the side face 11a of the guide groove 6 at the opposite side of the loaded points, bringing about any undesirable resistance to a rotation of the outer roller 16 which would be desirable to be avoided.

In the fourth embodiment of the present invention, as shown in the FIG. 6, the offset ($\delta$) between the trunnion centerline (Q) and the groove centerline (N) with a joint angle being zero is set to be $-0.02Ro < \delta \leq 0.093Ro$, wherein Ro is a radius of outer face of outer roller 16. Therefore, the offset can be kept small with any joint angle present. Consequently, it is possible to eliminate a generation of excessive moment on the outer roller 16, thereby avoiding excessive contact pressure between the groove 6 of the housing 3 and the outer roller 16 at the opposite side of the loaded side; whereby it is possible to obtain a low axial force and minimizes any rolling resistance acting against the outer roller 16.

Next, the fifth embodiment of the present invention will be described with reference to FIG. 10.

The main difference in the fifth embodiment from the first embodiment is that the inner diameter($\Phi do$) of the needle stopper or rim 16b formed at the end of the inside of the joint 1 on the cylindrical inner surface of the outer roller 16 is made to be smaller than the outer diameter($\Phi Di$) of the inner roller 12. In FIG. 10, like components described in the first embodiment of the present invention, and shown in FIG. 2, are designated by the same symbols. Additionally, since the basic structure of the fifth embodiment of the present invention is the same as that of the first embodiment, primarily, the details regarding the different components will be described hereinafter.

Figure 10:
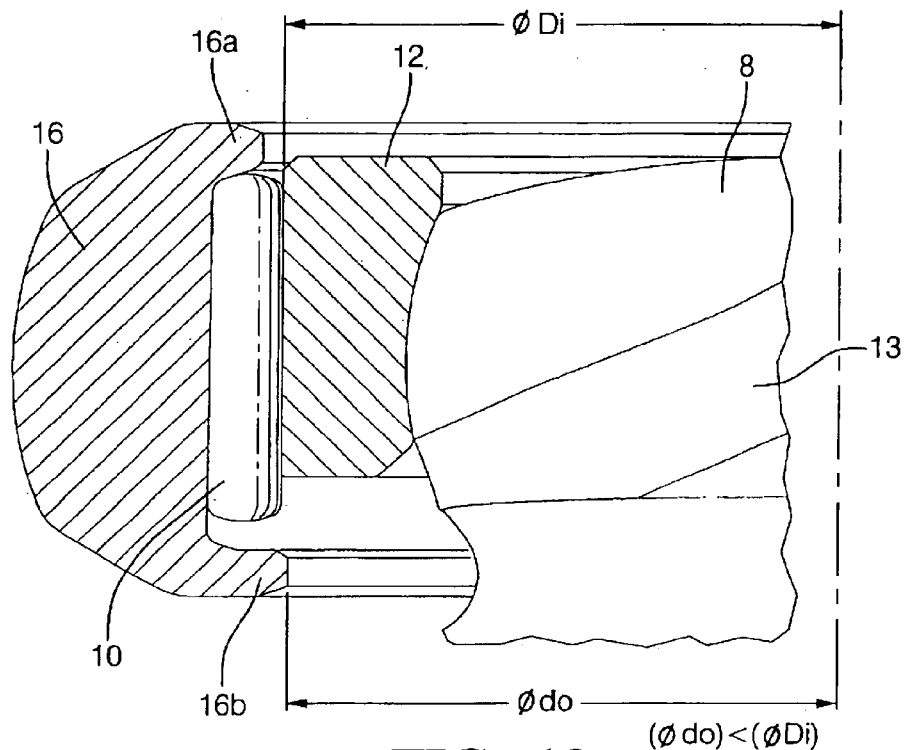
FIG. 10 is a cross-sectional view of a primary portion of the fifth embodiment of the present invention.

FIG. 10 is a cross-sectional view showing the fifth embodiment of the present invention. In the fifth embodiment, the relation ($\Phi do$)<($\Phi Di$) is provided, wherein $\Phi do$ is an inner diameter of the needle stopper or rim 16b formed on the cylindrical inner surface of the outer roller 16 at the inside of the joint 1 and $\Phi Di$ is an outer diameter of the inner roller 12. Therefore, it is difficult for the outer roller 16 to be detached from the inner roller 12. Further it is difficult for the needle bearing 10 to be detached from the inner rollers 12 and the outer rollers 16, since the outer roller 16 engages with a boss 7 of the tripod 5 when it is moved to inner radial side. Accordingly, it can be very easy to handle the assembled tripod 5 (in which the tripod 5, the inner rollers 12, the needle roller bearings 10, and the outer rollers 16 are assembled together).

Next, the sixth embodiment of the present invention will be described with reference to FIG. 11.

The main difference in the sixth embodiment from the first embodiment is that the outer diameter(ΦDii) of the needle stopper or rim 12a formed at the end of the outside of the joint 1 on the cylindrical outer surface of the inner roller 12 is made to be smaller than the inner diameter(Φdoo) of the outer roller 16. In FIG. 11, like components described in the first embodiment of the present invention, and shown in FIG. 2, are designated by the same symbols. Additionally, since the basic structure of the sixth embodiment of the present invention is the same as that of the first embodiment, primarily, the details regarding the different components will be described hereinafter.

Figure 11:
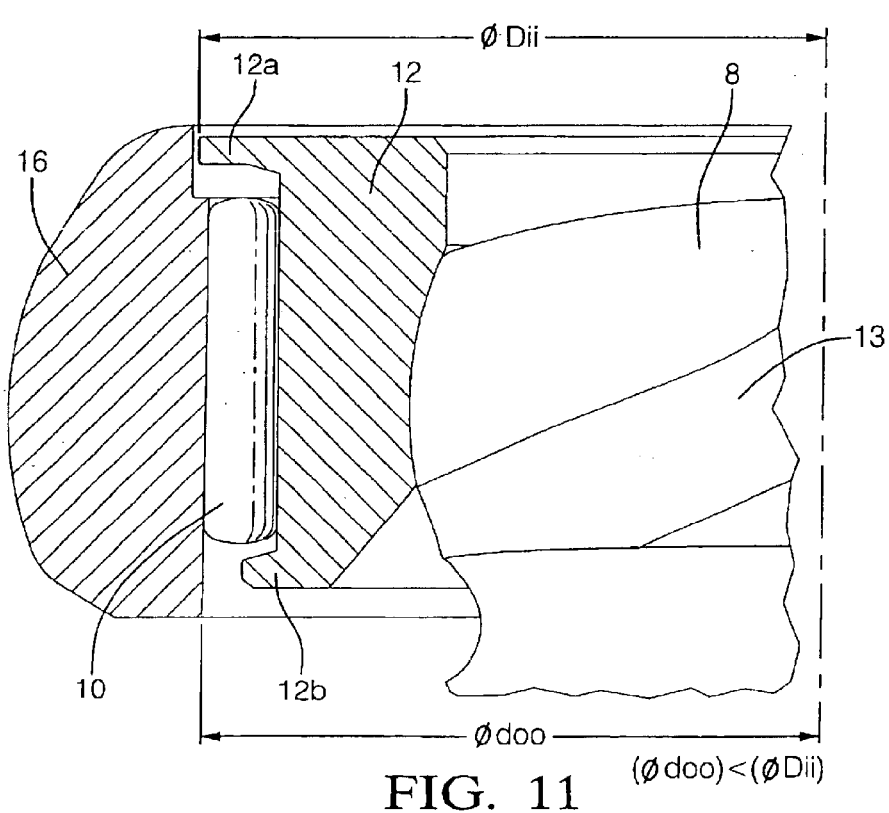
FIG. 11 is a cross-sectional view of a primary portion of the sixth embodiment of the present invention.

FIG. 11 is a cross-sectional view showing the sixth embodiment of the present invention. In the sixth embodiment, the relation (Φdoo)<(ΦDii) is provided, wherein ΦDii is an outer diameter of the needle stopper or rim 12a formed at the end of the outside of the joint 1 on the cylindrical outer surface of the inner roller 12 and Φdoo is an inner diameter of the outer roller 16. Therefore, it is difficult for the outer roller 16 to be detached from the inner roller 12. Accordingly, it can be very easy to handle the assembled tripod 5 (in which the tripod 5, the inner rollers 12, the needle roller bearings 10, and the outer rollers 16 are assembled together).

Next, the seventh embodiment of the present invention will be described with reference to FIG. 12.

The main difference in the seventh embodiment from the first embodiment is that the longitudinal cross radius (r) of the inner roller 12 is formed to be larger than the longitudinal cross radius (R) of the trunnion 8. In FIG. 12, like components described in the first embodiment of the present invention, and shown in FIG. 2, are designated by the same symbols. Additionally, since the basic structure of the seventh embodiment of the present invention is the same as that of the first embodiment, primarily, the details regarding the different components will be described hereinafter.

Figure 12:
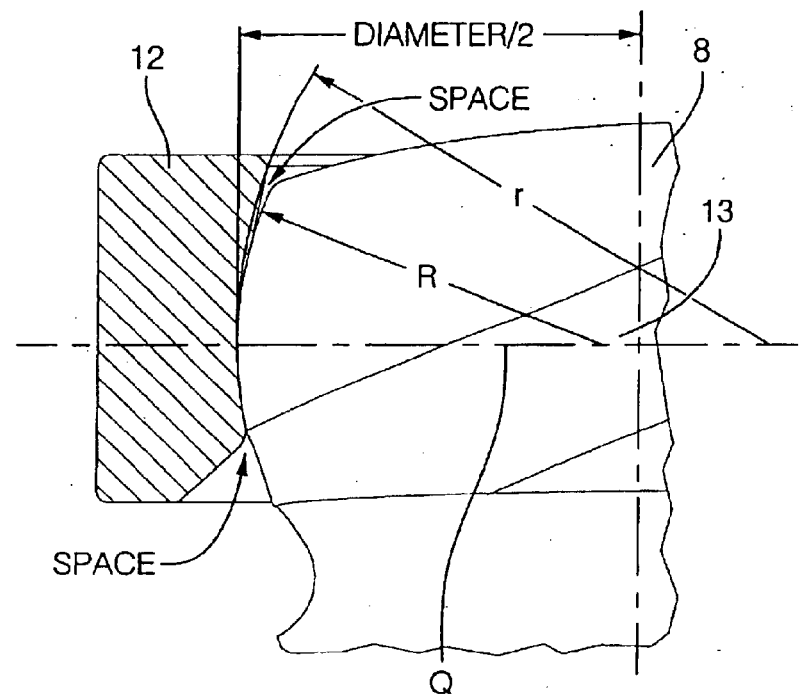
FIG. 12 is a cross-sectional view of a primary portion of the seventh embodiment of the present invention.

FIG. 12 is a cross-sectional view of the inner roller 12 and the trunnion 8, according to the seventh embodiment. In the seventh embodiment, when (r) is a radius of a longitudinal cross-sectional shape of the inner face of the inner roller 12 and (R) is a radius of a longitudinal cross-sectional shape of outer surface of the trunnion 8, the following relations exist;

$(r) \geq $ (diameter of trunnion (8))/2 and $(R) \leq $ (diameter of trunnion (8))/2 and $(R) < (r) \leq (3.8R)$

By setting in this way, sufficient grease-entry spaces are provided at both inner and outer sides to enable better greasing of the loaded contact area between the inner roller 12 and the trunnion 8. As a result, frictional resistance between the inner roller 12 and the trunnion 8 is minimized, providing remarkably improved smoothness of operation and in durability as compared with the prior art.

On the other hand, if the above radii (r) and (R) are substantially identical to each other (closely contact) as in the prior art, any axial movements of the trunnion 8 due to the rotation with any joint angle present may be absorbed only by the sliding between the inner roller 12 and the trunnion 8 in close contact therewith, thereby causing the sliding resistance to be much increased.

On the contrary, the seventh embodiment of the invention makes the radius (R) of the outer face of the trunnion 8 smaller than the radius (r) of the inner face of the inner roller 12. Thus, the trunnion 8 moves rolling on the inner face of the inner roller 12. Accordingly, a friction between the inner face of the inner roller 12 and the outer surface of the trunnion 8 can be reduced, thereby attaining a significant reduction of the axial movements of the trunnion 8.

Figure 13:
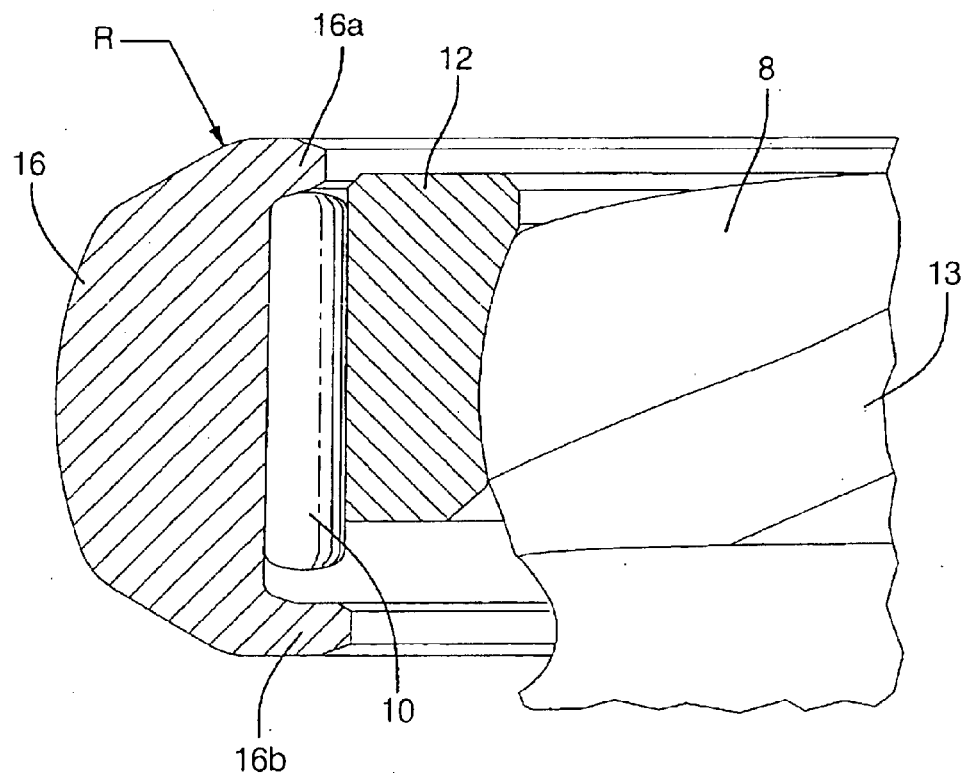
FIG. 13 is a cross-sectional view of a primary portion of the eighth embodiment of the present invention.
Figure 14:
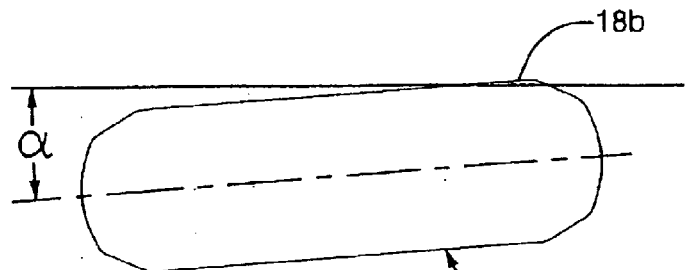
FIG. 14 is an explanatory view showing a state of edge contact of the eighth embodiment of the present invention.
Figure 15:
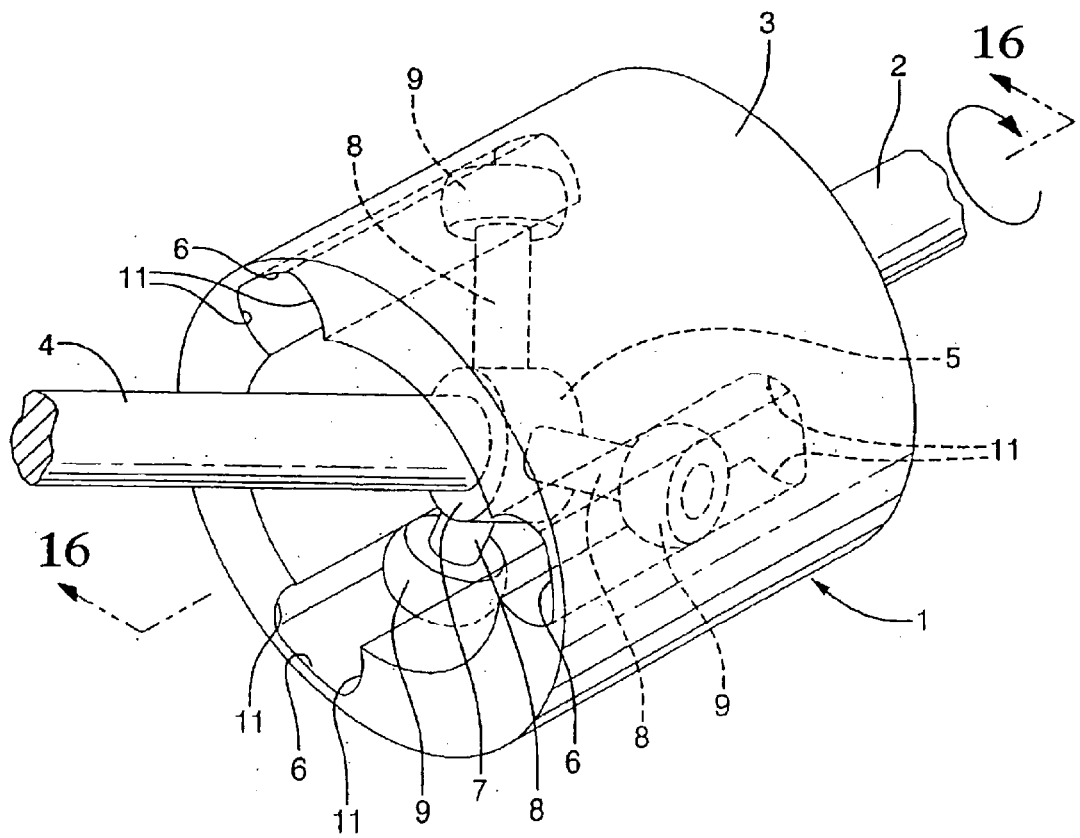
FIG. 15 is a schematic perspective view showing a conventional prior art tripod type constant velocity joint.
Figure 16:
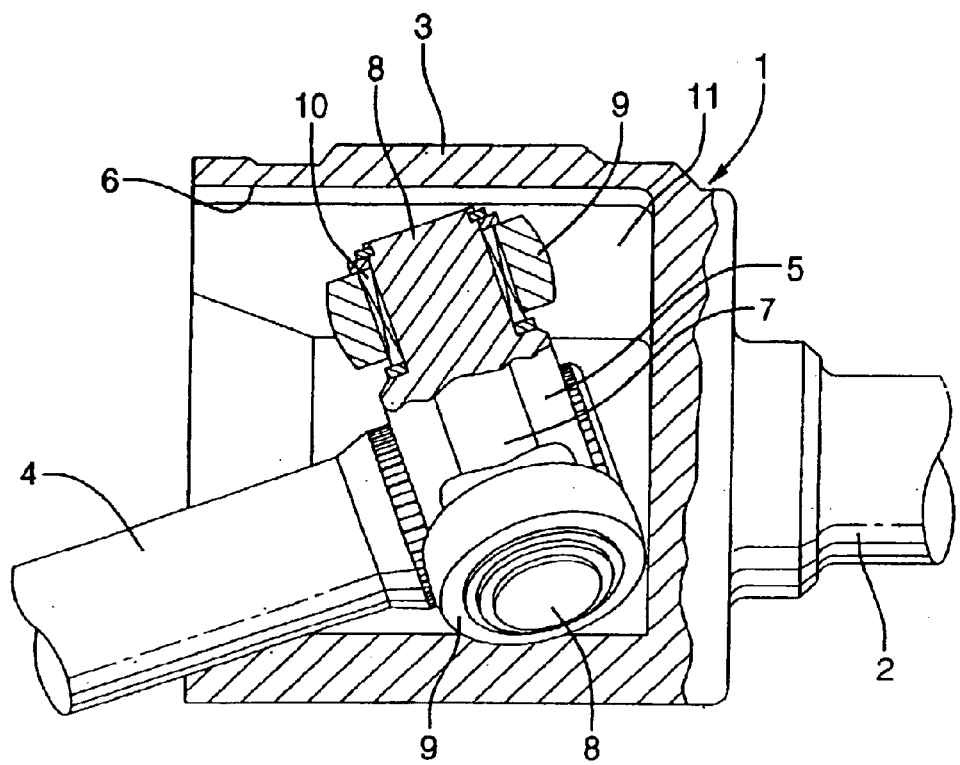
FIG. 16 is a schematic partial cross-sectional view taken along the line A—A of FIG. 15.
Figure 17:
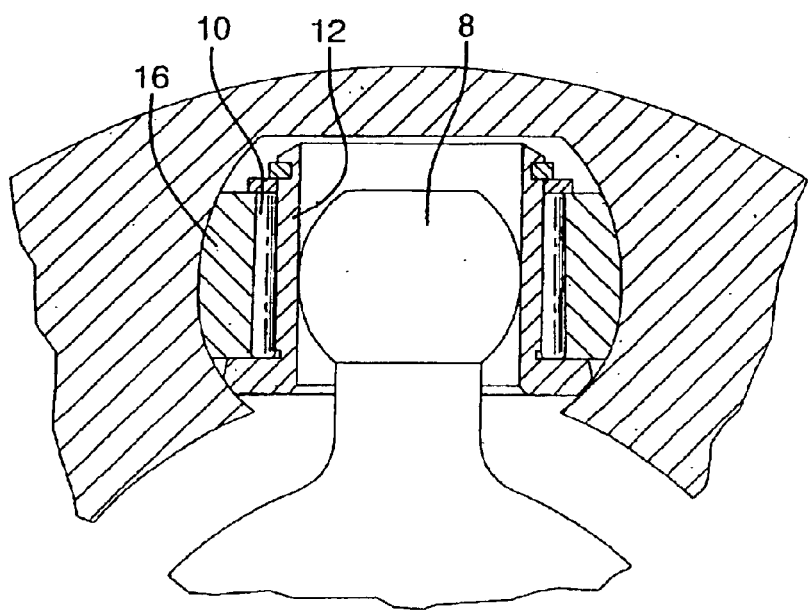
FIG. 17 is an explanatory partial enlarged view of another conventional prior art tripod constant velocity joint.
Figure 19:
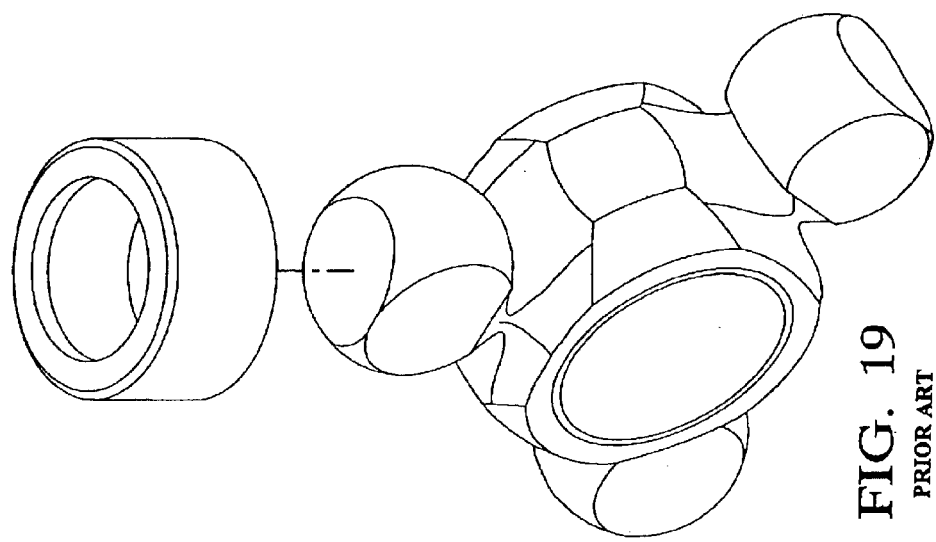
FIG. 19 is an explanatory partial enlarged view of a still another conventional prior art tripod constant velocity joint.
Figure 18:
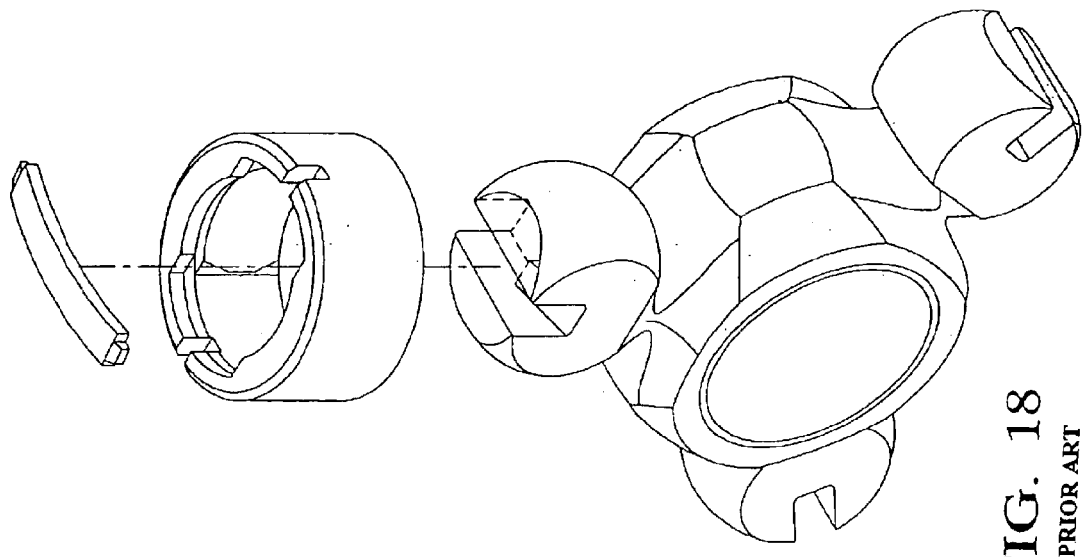
FIG. 18 is an explanatory partial enlarged view of vet an another conventional prior art tripod constant velocity joint.

Next, the eighth embodiment of the present invention will be described with reference to FIGS. 13 and 14. FIG. 13 is a cross-sectional view showing the eighth embodiment, and FIG. 14 is an schematical view in which the outer roller 16 and the tracking guide 18b (or 18a) are in contact with each other at their edges.

The main difference in the eighth embodiment from the first embodiment is that the outer roller 16 has a R-shaped chamfer which is in contact with the tracking guide 18b (or 18a) and is then guided by the same, and this R-shaped chamfer is continuous with the outside end surface. In FIG. 13, like components described in the first embodiment of the present invention, and shown in FIG. 2, are designated by the same symbols. Additionally, since the basic structure of the seventh embodiment of the present invention is the same as that of the first embodiment, primarily, the details regarding the different components will be described hereinafter.

In a conventional tripod type constant velocity joint 1, when it is rotated with any joint angle present, an outer roller 16 rolls along the grooves 11a and 11b parallel to the first rotating shaft 2, transmitting this rotation. At this time, as shown in FIG. 14, the outer roller 16 is guided by the tracking guide 18b (or 18a) and rolls with an angle of inclination (α) relative to the tracking guide 18b (or 18a), due to the axial and pivotal movements of the trunnion 8 and the outer roller 16. Additionally, the outside end surface of the outer roller 16 makes edge contact with the tracking guide 18b (or 18a), which causes an increase in frictional resistance against movement of the outer roller 16.

In the eighth embodiment of the present invention, the outside end surface of the outer roller 16 making edge contact with the tracking guide 18b (or 18a) as described above has the R-shaped chamfer which is continuous with the outer face of the outer roller 16. Accordingly, the R-shaped chamfer of the outer roller 16 can eliminate edge contact with the tracking guide 18b (or 18a), even in a case where the outer roller 16 moves with an angle of inclination (α) relative to the tracking guide 18b (or 18a). Thus, frictional resistance against movement of the outer roller 16 can be significantly reduced.

As described above, according to the present invention, a tripod type constant velocity joint of high-strength and high-durability can be provided with maintained low axial force and reduced vehicle shudder even when operating at an angle.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A constant velocity joint comprising:
a hollow housing having an opening at one end, an inner face of the housing being provided with three guide grooves extending in an axial direction of the housing and being spaced apart equally in a circumferential direction, each groove having a pair of side faces opposed to each other, extending in the axial direction, and a bottom portion connecting the side faces;
a tripod having three trunnions positioned in the grooves of the housing with each of the trunnions extending radially along respective trunnion axes, the trunnions being spaced apart equally in a circumferential direction and having end portions defining partially spherical outer surfaces with a trunnion centerline passing through a center of each of the end portions wherein the trunnion centerline is perpendicular to each of the respective trunnion axes;
inner rollers mounted to the end portions of respective trunnions with each of the inner rollers having a partially spherical inner face defining an inner diameter and a cylindrical outer surface, the spherical inner face of the inner rollers cooperating with the spherical outer surfaces of the trunnions such that the inner rollers may pivot freely on the respective outer surfaces of the trunnions;
outer rollers mounted to respective outer surfaces of the inner rollers through needle bearings, the outer rollers having cylindrical inner surfaces and spherical outer faces, the cylindrical inner surfaces of the outer rollers mating with the respective cylindrical outer surfaces of the inner rollers through the needle bearings to allow relative sliding movement between the inner and outer rollers allow the trunnion axis and the outer faces of the outer rollers mating with the side faces of respective guide grooves; and
a partial cylindrical face formed on each spherical outer surface of each trunnion with each cylindrical face having a diameter sized relative to the inner diameter of the inner rollers and inclined relative to both the trunnion centerline and the trunnion axis of each associated trunnion to present and expose the cylindrical face to the respective inner rollers to enable the inner rollers to be installed onto respective trunnions by aligning the inner rollers coaxially with the cylindrical faces and guiding the inner rollers axially over the diameter of the cylindrical faces into engagement with the trunnions.

2. A constant velocity joint according to claim 1, wherein:
the diameter (d) of each partial cylindrical face provided on each outer surface of each trunnion is related to the inner diameter (D) of each inner face of each inner roller in accordance with the following formula:

(d)<(D)

and

5°<angle(θ), wherein the angle(θ) is an angle between the trunnion centerline and a line connecting between the center of the trunnion and an edge of the partial cylindrical face with the edge of the cylindrical face being the farthest edge from the center of the trunnion.

3. A constant velocity joint according to claim 1 wherein the spherical outer surfaces of each of the trunnions includes a contact surface area engaging the spherical inner face of the inner roller for receiving a load during rotation of the joint and wherein the cylindrical face formed on the outer surface of each trunnion does not intersect the contact surface area on each trunnion.

4. A constant velocity joint, comprising:
a hollow housing having an open end and an inner face formed with three axially extending circumferentially spaced guide grooves;
a tripod disposed in said housing having three circumferentially spaced trunnions extending radially outwardly along respective trunnion axes into said guide grooves, each trunnion having an outer surface that is at least partially spherical with a trunnion centerline passing through a center of each of said trunnions wherein said trunnion centerline is perpendicular to each of said respective trunnion axes;
a roller assembly carried on each of said trunnions within said guide grooves and supported for rotation, angular and axial movement relative to said trunnions with said roller assembly having an inner face that is at least partially spherical to cooperate with said spherical outer surfaces of said trunnions; and
a cylindrical face formed on said spherical outer surface of each of said trunnions having a diameter sized relative to an inner diameter of said roller assembly with said cylindrical face inclined relative to both said respective trunnion axes and said respective trunnion centerlines to present and expose said diameter of said cylindrical face such that said roller assembly can be inserted onto said respective trunnion about said inclined cylindrical face.

5. The constant velocity joint of claim 4 wherein said outer surface of each of said trunnions includes a contact surface area engaging an inner face of said roller assembly for receiving a load during rotation of the joint and wherein said cylindrical face formed on said outer surface of each trunnion does not intersect said contact surface area on each trunnion.

6. A constant velocity joint comprising:
a hollow housing having an opening at one end, an inner face of the housing being provided with three guide grooves extending in an axial direction of the housing and being spaced apart equally in a circumferential direction, each groove having a pair of side faces opposed to each other, extending in the axial direction, and a bottom portion connecting the side faces;
a tripod having three trunnions positioned in the grooves of the housing with each of the trunnions extending radially along respective trunnion axes, the trunnions being spaced apart equally in a circumferential direction and having end portions defining partially spherical outer surfaces with a trunnion centerline passing through a center of each of the end portions wherein the trunnion centerline is perpendicular to each of the trunnion axes;
inner rollers mounted to the end portions of respective trunnions with each of the inner rollers having a partially spherical inner face defining an inner diameter (D) and a cylindrical outer surface, the inner face of the inner rollers cooperating with the outer surfaces of the trunnions such that the inner rollers may pivot freely on the respective outer surfaces of the trunnions;
outer rollers mounted to respective outer surfaces of the inner rollers through needle bearings, the outer rollers having cylindrical inner surfaces and spherical outer faces, the cylindrical inner surfaces of the outer rollers mating with the respective cylindrical outer surfaces of the inner rollers through the needle bearings and the outer faces of the outer rollers mating with the side faces of respective guide grooves; and a partial cylindrical face formed on each spherical outer surface of each trunnion with each cylindrical face having a diameter (d) which is less than the inner diameter (D) of each inner face of each inner roller, and said partial cylindrical face being inclined relative to the trunnion axis and inclined relative to the trunnion centerline of each associated trunnion by an angle($\theta$) to present and expose the cylindrical face to the respective inner rollers, wherein the angle($\theta$) is greater than 5° and is an angle between the trunnion centerline and a line connecting between the center of the trunnion and an edge of the partial cylindrical face with the edge of the cylindrical face being the farthest edge from the center of the trunnion, said inclined partial cylindrical face enabling the inner rollers to be installed onto respective trunnions by aligning the inner rollers coaxially with the cylindrical faces and guiding the inner rollers axially over the diameter (d) of the cylindrical faces into engagement with the trunnions.

7. A constant velocity joint according to claim 6 wherein the spherical outer surfaces of each of the trunnions includes a contact surface area engaging the spherical inner face of the inner roller for receiving a load during rotation of the joint and wherein the cylindrical face formed on the outer surface of each trunnion does not intersect the contact surface area on each trunnion.

* * * * *